(No Model.)
A. FALLS.
MECHANISM FOR STRIPPING THE TOP FLATS OF CARDING MACHINES.
No. 382,598. Patented May 8, 1888.
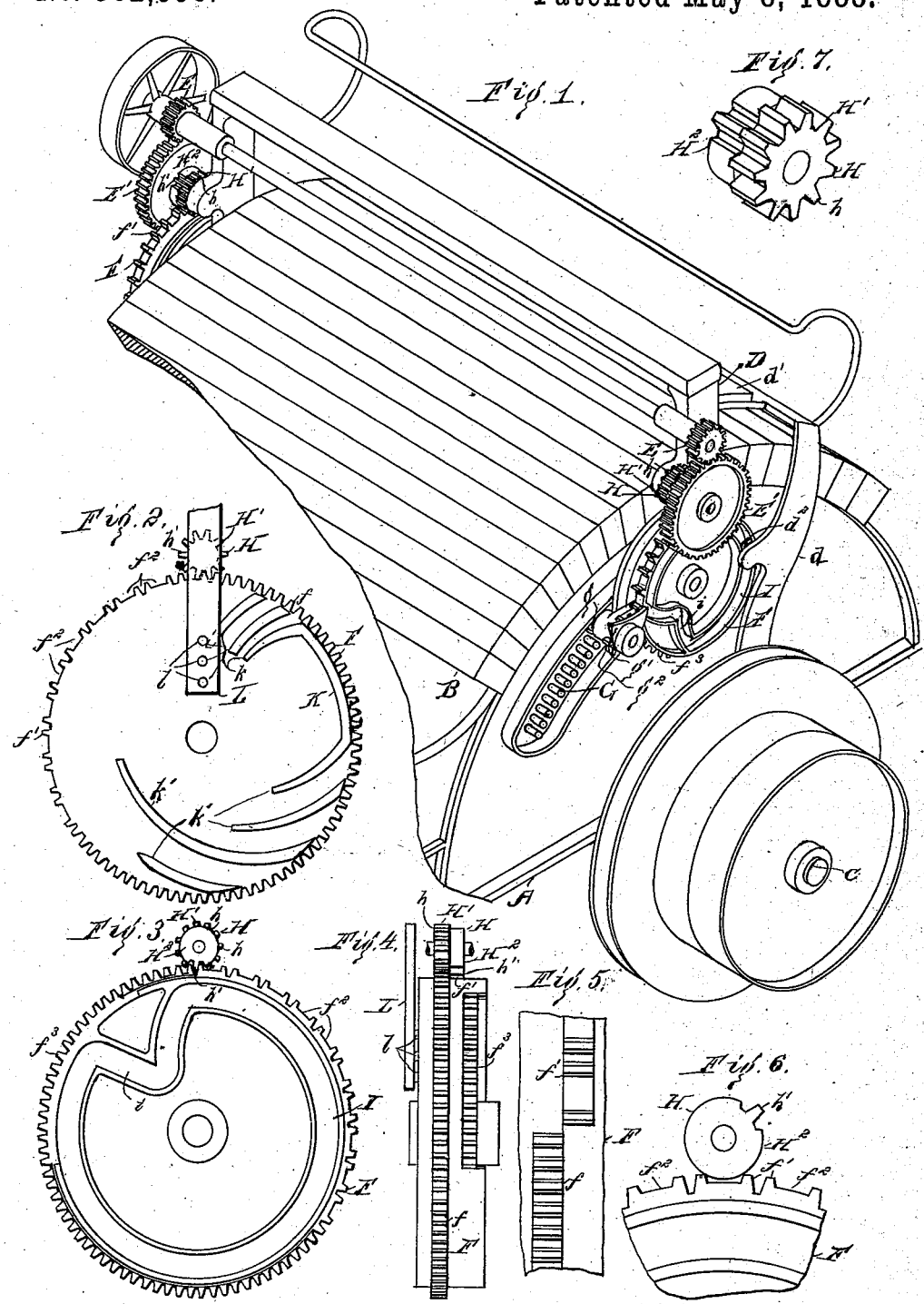

UNITED STATES PATENT OFFICE.

ALONZO FALLS, OF LOWELL, MASSACHUSETTS, ASSIGNOR OF ONE-HALF TO ALEXANDER G. CUMNOCK, OF SAME PLACE.

MECHANISM FOR STRIPPING THE TOP-FLATS OF CARDING-MACHINES.

SPECIFICATION forming part of Letters Patent No. 382,598, dated May 8, 1888.

Application filed July 29, 1887. Serial No. 245,602. (No model.)

*To all whom it may concern:*

Be it known that I, ALONZO FALLS, a citizen of the United States, residing at Lowell, in the county of Middlesex and Commonwealth of Massachusetts, have invented a new and useful Improvement in Mechanism for Stripping the Top-Flats of Carding-Machines, of which the following is a specification.

My invention relates to mechanism for stripping the top-flats of carding-machines; and it consists in improved means, hereinafter described and claimed, for moving said mechanism more rapidly while stripping the top-flats than while traversing from one top-flat to another, in order that the operation of stripping may be performed as rapidly as possible, and that the top-flats may be raised from the cylinder for as short a time as possible.

In the accompanying drawings, Figure 1 is an isometric view of so much of a carding-machine with my improvement applied thereto as is necessary to understand my invention; Fig. 2, an elevation of the inner side of the stripping cam-gear and its actuating-pinion, showing the lifting-cams, the lifting-rod and its pins, and showing also the peculiar arrangement of the teeth of the cam-gear and actuating-pinion; Fig. 3, an elevation of the outside of the stripping cam-gear and its actuating-pinion; Fig. 4, a side elevation of the parts shown in Figs. 2 and 3 in the positions they occupy in said figures; Fig. 5, an enlarged plan of a part of the cam-gear, showing the adjacent ends of the rows of fast and slow motion teeth; Fig. 6, a side elevation of part of the stripping cam-gear provided with slow-motion teeth, and of the one-toothed pinion or one-toothed part of the actuating-pinion; Fig. 7, an isometric view of the actuating-pinion.

The frame A of the carding-machine, the top-flats B, the main shaft C, the frame D of the stripping mechanism, stripper-arm $d$, the stripper $d'$, the traverse-pinion $g$, the traverse-rack G, with which the pinion $g$ engages to move the stripping mechanism from one flat to another, the guard $g'$ and pinion $g^2$, both turning with the pinion $g$, and the pinion E, operating the stripping mechanism, are all of the usual construction and operation, the frame D swinging upon the main shaft C of the carding-machine, as shown in Patent No. 16,504, granted January 27, 1857, to George Wellman. The pinion E engages with an intermediate gear, E', but instead of the usual single pinion, which is ordinarily secured to the gear E', concentrically therewith, and which drives the stripping cam-gear F by engaging with spur-teeth of uniform pitch commonly arranged around the entire circumference of said stripping cam-gear, I use a double actuating-pinion, H, and I modify the stripping cam-gear, as hereinafter described, to secure the fast and slow motion of the stripping mechanism. The double actuating-pinion consists of two united pinions, H' H², one pinion thereof having a definite number of spur-teeth, $h$, (eleven being shown in the drawings,) arranged at equal intervals and having a uniform pitch, which teeth $h$ engage with a row of teeth, $f$, on the stripping cam-gear F, these teeth $f$ being arranged at equal intervals with each other and corresponding in pitch to the pitch of the teeth $h$, and being in number a multiple of the number of teeth $h$. The other part or pinion, H², of the double actuating-pinion H is provided with a single tooth, $h'$, and is constructed substantially like the stop-pinion of a Geneva stop-motion, the single tooth of said one-toothed pinion being of the same length and pitch as any tooth $h$. The sector of the cam-gear F not provided with the teeth $f$ is provided with a series of double teeth, $f'$, arranged in pairs, the outer sides of which double teeth have the same length and pitch as the teeth $f$, the space $f^2$ between two members of a double tooth representing a rest, the cam-gear F being locked or prevented from moving while the untoothed portion of the circumference of the actuating-pinion is between the members of a double tooth, one side of the single tooth $h'$ coming in contact with one outer face of the double tooth, and the other face of the single tooth $h'$ coming in contact with the other face of said double tooth, and the distance between one double tooth $f'$ and the next being the same as between two successive teeth $f$. The single tooth $h'$ of the actuating-pinion is in the same axial plane with one of the teeth $h$, as shown in Fig. 7, and when the untoothed part of said actuating-pinion is between two members of a double tooth it is in contact with both of said members, as shown in Fig. 6. Evidently by varying the diameter of the untoothed part of the single-toothed pinion of the actuating-pinion the distance apart of the members of each double tooth may be correspondingly varied, provided the length of the row of double teeth is not varied.

It will be understood that the single teeth $f$ and the double teeth $f'$, although in different planes are in effect continuous with each other, the two gear-sectors which carry said rows of single and double teeth together forming a complete circle.

The actuating-pinion H is secured to the intermediate gear, E', and is driven continuously at a uniform speed, so that when the teeth $h$ of the actuating-pinion are in engagement with the single spur-teeth $f$ of the stripping cam-gear said stripping cam-gear has a continuous rotary motion; but when the single-toothed pinion of the actuating-pinion engages with the double teeth $f'$ the cam-gear has a much slower intermittent motion, one revolution of the actuating-pinion at this time rotating the cam-gear an angular distance represented by one double tooth, and the cam-gear being at a rest during the greater part of the revolution of said actuating-pinion.

The cam-groove I is of the usual shape and engages the stud $d^2$, which projects from the stripper-arm $d$, and the effective portion $i$ of said cam-groove is in engagement with the stud $d^2$ only when the cam-gear F is rotating at its fastest speed. A third set of spur-teeth, $f^3$, extending partly around the cam-gear F, engage with the pinion $g^2$, above named, said last-named pinion being concentric with and turning with the traverse-pinion for the purpose above stated, said teeth $f^3$ being in a different plane from that occupied by either of the other rows $f\ f'$ of teeth on the cam-gear, these different sets of teeth being so arranged that the slower motion of the cam-gear and the traversing of the stripping mechanism take place at the same time. The lifting-cam K has cam portions $k\ k'$, which engage horizontal pins $l$, projecting from the lifting-rod L, to raise and lower said lifting-rod, and which are so arranged on the inner face of said cam-gear as to operate the lifting-rod and to raise the top-flat to be operated upon and to restore said top-flat to position after the same has been stripped while the cam-gear is being rotated at its faster speed.

It will be understood that the exact number of teeth shown in the drawings is not absolutely essential; but the respective arcs occupied by the single and double teeth, and the number of teeth $h$ of the actuating-pinion, should be such that the operations of lifting, stripping, and restoring the top-flats to their positions will be begun and completed while the cam-gear has its faster motion.

The construction above described allows the general speed of the stripping mechanism to be increased.

I claim as my invention—

The combination of the main shaft, the supporting-frame swinging on said shaft, a double actuating-pinion, one pinion of which is provided with spur-teeth of uniform pitch arranged at equal intervals around the same, and the other pinion of which is provided with a single spur-tooth of the same pitch as said first-named teeth, the stripping cam-gear provided with a cam-groove and with a set of spur-teeth corresponding in pitch with the teeth of said actuating-pinion, and provided also with a set or row of double teeth adapted to be engaged by the single tooth of said actuating-pinion, said sets of teeth of said cam-gear being continuous with each other, the stripping-arm provided with a stripper and with a projection which engages said cam-groove, the lifting-cam secured to said cam-gear, the lifting-rod provided with pins to engage said lifting-cam, and means, substantially as described, for imparting to said actuating-pinion a continuous and uniform rotary motion, the traverse-rack, the traverse pinion engaging said rack, and another pinion secured to said traverse-pinion concentrically therewith and engaging a third set of teeth with which said cam-gear is provided, said sets of teeth on said cam-gear being arranged, as described, so that said cam-gear and said lifting-cam are rotated at a greater speed while said lifting-rod is being raised and while the stripper is being operated and at a less speed when the stripping mechanism is traversing from one flat to another, as and for the purpose specified.

In witness whereof I have signed this specification, in the presence of two subscribing witnesses, this 25th day of July, A. D. 1887.

ALONZO FALLS.

Witnesses:
ALBERT M. MOORE,
EDWARD W. THOMPSON.